US012399003B2

(12) United States Patent
Davis

(10) Patent No.: US 12,399,003 B2
(45) Date of Patent: Aug. 26, 2025

(54) LASER LEVEL TARGET POSTS

(71) Applicant: JPMorgan Chase Bank, N.A., New York, NY (US)

(72) Inventor: Tristan Davis, Aurora, CO (US)

(73) Assignee: JPMORGAN CHASE BANK, N.A., New York, NY (US)

(*) Notice: Subject to any disclaimer, the term of this patent is extended or adjusted under 35 U.S.C. 154(b) by 714 days.

(21) Appl. No.: 17/671,261

(22) Filed: Feb. 14, 2022

(65) Prior Publication Data

US 2023/0258448 A1 Aug. 17, 2023

(51) Int. Cl.
*G01C 5/00* (2006.01)

(52) U.S. Cl.
CPC ...................... *G01C 5/00* (2013.01)

(58) Field of Classification Search
CPC .............. G01C 5/00; G01C 15/004
See application file for complete search history.

(56) References Cited

U.S. PATENT DOCUMENTS

| | | | | |
|---|---|---|---|---|
| 7,886,450 B1* | 2/2011 | Fiano | ................ | G01C 15/105 33/290 |
| 8,036,452 B2* | 10/2011 | Pettersson | ............. | G01C 15/00 382/154 |
| 8,209,874 B1* | 7/2012 | Tribble | ................ | G01C 15/06 33/286 |
| 8,567,077 B2* | 10/2013 | Wernig | ................ | H01Q 3/005 33/286 |
| 8,621,760 B2* | 1/2014 | Norelli | ................ | G01C 9/28 33/DIG. 1 |
| 10,094,076 B2* | 10/2018 | Fujimoto | ............. | E01C 19/004 |
| 10,684,124 B1* | 6/2020 | Hanchett | ............. | G06F 3/04815 |
| 10,710,751 B2* | 7/2020 | Monleón de la Lluvia Jordá | | B64F 5/60 |
| 11,253,768 B1* | 2/2022 | Amron | ................ | G01S 13/74 |
| 11,781,866 B1* | 10/2023 | Lockhart | ............. | G01C 15/105 33/286 |
| 11,828,596 B2* | 11/2023 | Rueb | ................ | B25H 7/00 |
| 12,078,483 B2* | 9/2024 | Hammerer | ........... | G01B 11/272 |
| 12,098,931 B1* | 9/2024 | Passarini | ............. | G01S 17/42 |
| 2007/0153297 A1* | 7/2007 | Lau | ................ | G01C 15/006 356/620 |
| 2011/0138642 A1* | 6/2011 | Norelli | ................ | G01C 9/28 33/451 |
| 2013/0097880 A1* | 4/2013 | Wernig | ................ | H01Q 3/005 33/286 |
| 2015/0022826 A1* | 1/2015 | Cramer | ................ | G01B 11/14 356/620 |

(Continued)

FOREIGN PATENT DOCUMENTS

| | | | | |
|---|---|---|---|---|
| CN | 114646970 A | * | 6/2022 | ........... G01B 11/272 |
| EP | 4015994 A1 | * | 6/2022 | ........... G01B 11/272 |

*Primary Examiner* — Yaritza Guadalupe-McCall

(74) *Attorney, Agent, or Firm* — Greenblum & Bernstein, P.L.C.

(57) ABSTRACT

In one example, a laser level target post for leveling a server cabinet is disclosed. The laser level target post includes an elongated body section and a reflective surface at a top end of the elongated body section. The top end reflective surface is to reflect a received light beam for leveling a top surface of the server cabinet. The laser level target post also includes a magnetic base at a bottom end of the elongated body section. The magnetic base may attach the laser level target post to a corner of the top surface of the server cabinet.

18 Claims, 2 Drawing Sheets

(56) References Cited

U.S. PATENT DOCUMENTS

| | | | |
|---|---|---|---|
| 2016/0116282 A1* | 4/2016 | Unger | G01S 17/88 |
| | | | 33/228 |
| 2018/0343421 A1* | 11/2018 | Kahle | G01C 11/06 |
| 2022/0196403 A1* | 6/2022 | Hammerer | G01C 15/002 |
| 2023/0258448 A1* | 8/2023 | Davis | G01C 15/004 |
| | | | 33/290 |
| 2023/0314172 A1* | 10/2023 | Shi | G01C 25/00 |
| | | | 73/1.79 |

* cited by examiner

LASER LEVEL TARGET POSTS

BACKGROUND

Laser levels find use in the fields of construction, surveying and other like areas. A typical laser level can project a beam of laser light onto a surface for use in alignment applications. The beam of light is projected along a horizontal or vertical line or plane for use as a visual chalk line for alignment applications. Some laser levels may be positioned on a tripod on the ground. However, the light beam from the laser is projected with reference to gravity so that the light beam plane is perfectly level even when the ground is uneven.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

Many data centers have uneven flooring. Such uneven flooring can arise if poured concrete is used as opposed to perforated flooring. Poured concrete flooring can vary by a few inches over a row of server cabinets which can cause the server cabinets to have different heights.

A laser level may be used to align the tops of all of the server cabinets. The laser level projects a laser light beam above the server cabinets for use as a reference. A first engineer climbs a ladder to visually examine the alignment of the server cabinet tops and the line of the reference light beam. A second engineer remains on the ground to adjust the server cabinet feet/legs to increase or decrease the height of the server cabinet tops to align with the reference light beam.

This process can be inefficient because it requires multiple engineers to install and align the server cabinets. Moreover, parallax error may occur when the first engineer on the ladder misjudges the alignment of a server cabinet top and the reference light beam because the alignment is being viewed from an angle. Notwithstanding this potential inaccuracy, the process can also be unsafe as it requires the use of a ladder to climb high enough to view the server cabinet tops.

Accordingly, examples of the present disclosure address the foregoing by providing a laser level target post for leveling a server cabinet. The laser level target post includes an elongated body section and a reflective surface at a top end of the elongated body section. The top end reflective surface is to reflect a received light beam to facilitate leveling of a top surface of the server cabinet. Here, the light reflected by the reflective surface is visible from the ground, and the server cabinets can be adjusted without climbing a ladder. The laser level target post also includes a magnetic base at a bottom end of the elongated body section. The magnetic base may attach the laser level target post to a corner of the top surface of the server cabinet.

In this manner, the server cabinet installation/alignment process is efficient because multiple engineers are not necessary to install and align the server cabinets during a data center installation. The process can be completed by a single engineer because the reflected surface is visible from the ground. Moreover, parallax error may be eliminated because the engineer on the floor can walk around and view the alignment between the reflective surfaces and the reference laser light beam from multiple angles. Further yet, this process is much safer as the engineer need not climb a ladder for alignment validation.

Figure 1:
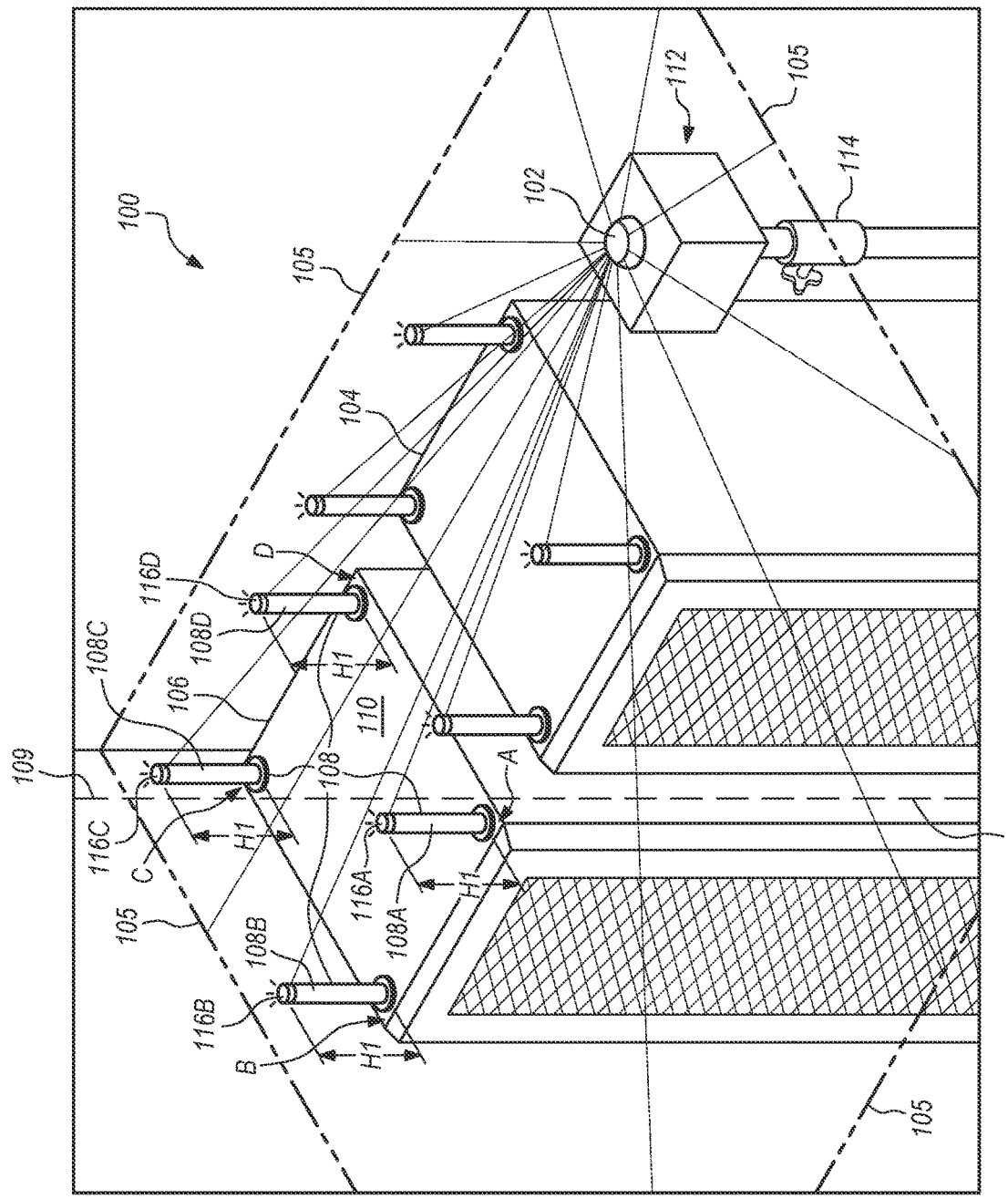
FIG. 1 illustrates a server cabinet leveling system for leveling the tops of server cabinets according to an example of the present disclosure.

FIG. 1 illustrates a server cabinet leveling system 100 for leveling the tops of server cabinets 104, 106 according to an example of the present disclosure.

Here, among other components, server cabinet leveling system 100 includes a set 108 of laser level target posts 108A, 108B, 108C, and 108D as well as a laser level 112 for leveling the top of server cabinet 106. By the term "leveling," it is meant that a top surface 110 of server cabinet 106 and the top surfaces of adjacent server cabinets (e.g. 104) are horizontally aligned with reference to a laser light beam 105. Further, although set 108 in this example includes four laser level target posts 108A, 108B, 108C, and 108D, set 108 may include additional or fewer laser level target posts. Moreover, the laser level target posts on server cabinet 104 are similar to the laser level target posts 108A, 108B, 108C, and 108D but are not described for brevity.

As shown, laser level target posts 108A, 108B, 108C, and 108D are positioned in respective corners of server cabinet 106. That is, laser level target post 108A is positioned at corner A of server cabinet 106, laser level target post 108B is positioned at corner B of server cabinet 106, laser level target post 108C is positioned at corner C of server cabinet 106 and laser level target post 108D is positioned at corner D of server cabinet 106. By positioning laser level target posts at each corner of server cabinet 106, the alignment of the entirety of the top surface 110 of server cabinet 106 with the laser light beam 105 can be facilitated by adjusting a leg/foot (not shown) below the respective laser level target post.

A height H1 of all laser level target posts 108A, 108B, 108C, and 108D is the same, for example, to align the laser level target posts 108A, 108B, 108C, and 108D and the reference laser light beam 105. An exemplary target post height H1 may be 12 inches. Moreover, in an example, all laser level target posts are aligned in parallel with the vertical axis of their corresponding server cabinets. For example, laser level target posts 108A, 108B, 108C, and 108D are aligned in parallel with the vertical axis 109 of server cabinet 106.

Referring now to FIG. 1, server cabinet leveling system 100 further includes the laser level 112. Laser level 112 may attach to a tripod 114 that is placed on the ground of the data center. As shown in this example, laser level 112 projects the laser light beam 105 that serves as a reference line or plane for adjusting the top surface 110 of server cabinet 106 and adjacent server cabinet top surfaces.

In operation, an engineer or other user begins by placing the laser level 112 on a tripod (or on a server cabinet) as desired and then activating the laser level 112 to project the laser light beam 105. The laser light beam 105 is projected at a predetermined height above the surface 110 of server cabinet 106. The predetermined height at which the laser light beam 105 is projected is the same as the height H1 of the laser level target posts 108A, 108B, 108C, and 108D above the server cabinets. The laser light beam 105 then forms a reference line or plane by which the laser level target posts 108A, 108B, 108C, and 108D are aligned. As will be further discussed with reference to FIG. 2, each laser level target post 108A, 108B, 108C, and 108D includes a top end reflective surface 116A, 116B, 116C, or 116D.

While remaining on the data center floor, the engineer can observe whether the reflective surfaces 116A, 116B, 116C, and 116D are reflecting the reference laser light beam 105. Based on this observation, the engineer can adjust the corresponding legs of the server cabinet 106, if necessary.

As an example, if reflective surface 116A is reflecting the reference laser light beam 105, the corner A of the surface 110 is at the correct height and needs no adjustment. In contrast, if reflective surface 116B is not reflecting the reference laser light beam 105, then the corner B of the surface 110 is not aligned or level. The engineer can then adjust the server cabinet foot at corner B to raise or lower corner B until reflective surface 116B can reflect the reference laser light beam 105.

In this manner, the server cabinet installation/alignment process is efficient because multiple engineers are not necessary to install and align the server cabinets during a data center installation. The process can be completed by a single engineer. Moreover, parallax error may be eliminated because the engineer is on the floor and can walk around and view the alignment between the reflective surfaces and the reference laser light beam from multiple angles. Further yet, this process is much safer because the engineer need not climb a ladder for alignment validation.

Figure 2:
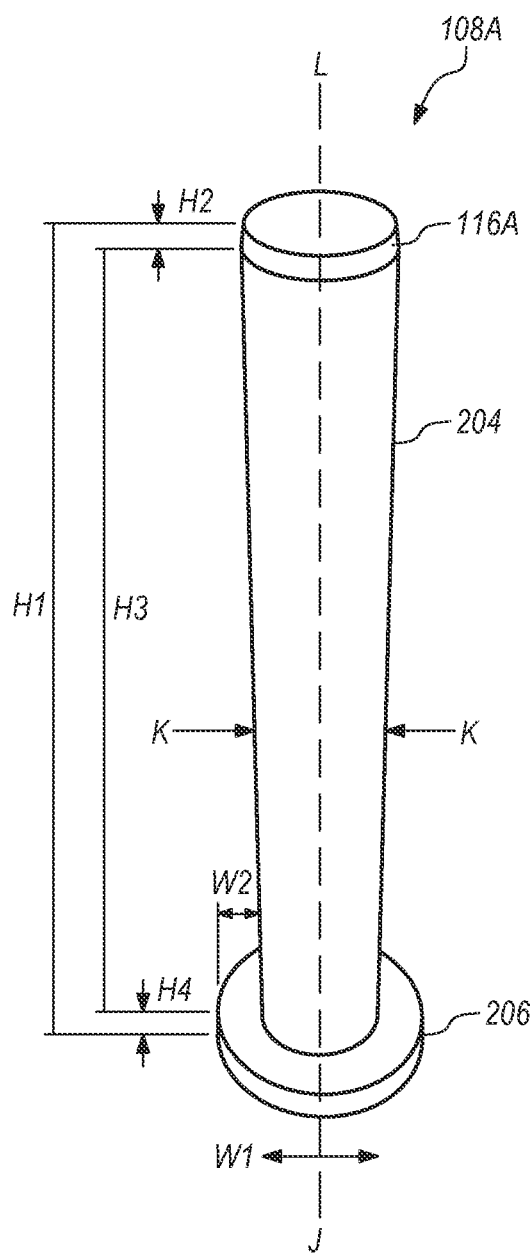
FIG. 2 illustrates the laser level target post of FIG. 1 for leveling a server cabinet according to an example of the present disclosure.

FIG. 2 illustrates the laser level target post 108A of FIG. 1 for leveling server cabinet 106 (FIG. 1) according to an example of the present disclosure. Although not illustrated, the level target posts 108B, 108C, and 108D and laser level target post 108A are similar.

In FIG. 2, laser level target post 108A includes the reflective surface 116A (also in FIG. 1), an elongated body section 204 and a magnetic base 206. Reflective surface 116A is positioned at a top end of the elongated body section 204 while the magnetic base 206 is located at a bottom end of elongated body section 204.

As noted above, top end reflective surface 116A is to reflect the reference laser light beam 105 to aid in leveling the top surface 110 of server cabinet 106. Reflective surface 116A can be any reflective material consistent with the present disclosure. As an example, reflective surface 116A can be mylar. As another example, reflective surface 116A may be polished anodized aluminum.

The reflective surface (and the laser level target post 108A) may be part of an injection molding process, 3D printing process or the like. Or the reflective material may be attached around the periphery of the top end of laser level target post 108A upon completion of the molding process. In FIG. 2, height H2 of reflective surface 116A can vary depending upon the particular application. In one example, height H2 is $1/8^{th}$ of an inch. In another example, H2 is one inch.

In FIG. 2, the elongated body section 204 connects reflective surface 116A and the magnetic base 206. For some examples, elongated body section 204 can be tubular as shown. Although not shown, other shapes consistent with the present disclosure may be utilized. For example, elongated body section 204 may have a polygonal shape.

Figure 3:
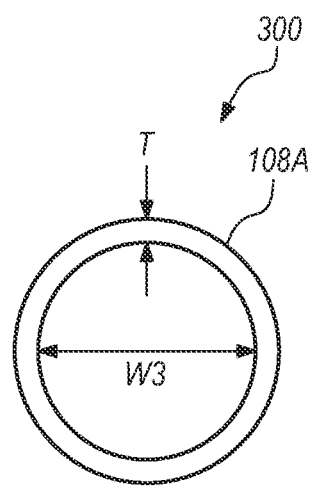
FIG. 3 shows a cross-section of the elongated body section at point K-K of FIG. 2.

Elongated body section 204 may also be hollow. FIG. 3 shows a cross-section 300 of elongated body section 204 at point K-K of FIG. 2. As can be seen, in an example, elongated body section 204 is hollow with an internal diameter W3. Here, W3 may be ½ inch, for example. A thickness T of the wall of elongated body section 204 may be $1/16$ inch.

The elongated body section 204 provides much of the height H3 of laser level target post 108A. By the term "elongated" it is meant that height H3 of elongated body section 204 is much greater than an external diameter W1 of the elongated body section 204. As an example, height H3 can be 10 inches while the external diameter W1 is one inch. Thus, in this example, "elongated" means an order of magnitude of 10 to 1.

Although not shown, elongated body section 204 may be adjustable to change its height as needed. In this example, elongated body section 204 may comprise two sleeves where one sleeve slides into another to adjust the height of elongated body section 204.

In FIG. 2, the magnetic base 206 is comprised of magnetic material to attach laser level target post 108A to corner A of top surface 110 of server cabinet 106. As shown, the height H4 of magnetic base 204 may be 1 inch. The magnetic base 204 itself has a flare having a width W2 beyond the external diameter W1 of the elongated body section 204. In one example, width W2 is 0.5 inches on either side of elongated body section 204.

Here, note that this tubular elongated body section 204, the top end reflective surface 116A and the bottom end magnetic base 206 are concentric. That is, elongated body section 204, reflective surface 116A and magnetic base 206 are concentric about a longitudinal axis L shown in FIG. 2.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure which is defined by the appended claims along with their full scope of equivalents.

The invention claimed is:

1. A laser level target post for leveling a server cabinet, the laser level target post comprising:
   an elongated body section extending in a longitudinal direction, the elongated body section having an external surface that extends in the longitudinal direction;
   a reflective surface at a top end of the external surface of the elongated body section, wherein the top end reflective surface is operable to reflect a received light beam for leveling a top surface of the server cabinet; and
   a magnetic base at a bottom end of the elongated body section, wherein the magnetic base is operable to attach the laser level target post to a corner of the top surface of the server cabinet such that the longitudinal direction extends vertically,
   wherein the top reflective surface is operable to reflect the received light beam if the top surface of the server cabinet is level and wherein the top reflective surface is positioned to not reflect the received light beam if the top surface of the server cabinet is not level.

2. The laser level target post of claim 1 wherein the elongated body section is tubular.

3. The laser level target post of claim 2 wherein the tubular elongated body section, the top end reflective surface and the bottom end magnetic base are concentric.

4. The laser level target post of claim 1 wherein the top end reflective surface is positioned to reflect the light beam received from a laser level.

5. The laser level target post of claim 1 wherein the top end reflective surface is to position at a predetermined vertical height from the top surface of the server cabinet.

6. The laser level target post of claim 1, wherein an axis of the elongated body section and an axis of the server cabinet are parallel.

7. The laser level target post of claim 1 wherein the reflective surface is parallel to the longitudinal direction.

8. The laser level target post of claim 1 wherein the reflective surface is arranged around an entire periphery of the top end of the external surface of the elongated body section.

9. The laser level target post of claim 1 wherein the light beam defines a height plane for leveling the top surface of the server cabinet, and the top end reflective surface is operable to reflect the light beam received when the top end reflective surface is aligned with the height plane.

10. A laser level target post for leveling a server cabinet, the laser level target post comprising:
an elongated body section;
a reflective surface at a top end of the elongated body section, wherein the top end reflective surface is to reflect a received light beam for leveling a top surface of the server cabinet; and
a magnetic base at a bottom end of the elongated body section, wherein the magnetic base is to attach the laser level target post to a corner of the top surface of the server cabinet,
wherein the top reflective surface is operable to reflect the received light beam if the top surface of the server cabinet is level, and
wherein the top reflective surface is positioned to not reflect a received light beam if the top surface of the server cabinet is not level.

11. A set of laser level target posts for leveling a server cabinet, the set of laser level target posts comprising:
a plurality of laser level target posts to position on corners of the server cabinet, wherein each laser level target post comprises:
an elongated body section extending in a longitudinal direction, the elongated body section having an external surface that extends in the axial direction;
a reflective surface at a top end of the external surface of the elongated body section; and
a magnetic base at a bottom end of the elongated body section,
wherein the magnetic base is operable to position the plurality of laser level target posts on each of said four corners of the server cabinet such that the longitudinal direction extends vertically, and
wherein the top reflective surface is positioned to not reflect a received light beam if the top surface of the server cabinet is not level.

12. The set of laser level target posts of claim 11 wherein each one of the plurality of laser level target posts has the same length.

13. The set of laser level target posts of claim 12 wherein the tubular elongated body section, the top end reflective surface and the bottom end magnetic base are concentric.

14. The set of laser level target posts of claim 11 wherein the elongated body section is tubular.

15. The set of laser level target posts of claim 11 wherein the top end reflective surface is positioned to reflect a light beam received from a laser level.

16. The set of laser level target posts of claim 11 wherein the top end reflective surface is to position at a predetermined vertical height from the top surface of the server cabinet.

17. The set of laser level target posts of claim 11 wherein the top reflective surface is operable to reflect a received light beam if the top surface of the server cabinet is level.

18. The set of laser level target posts of claim 11 wherein the light beam defines a height plane for leveling the top surface of the server cabinet, and the top end reflective surface of each of the plurality of laser level target posts is operable to reflect the light beam received when the top end reflective surface is aligned with the height plane.

\* \* \* \* \*